United States Patent [19]

Franck et al.

[11] 4,444,247

[45] Apr. 24, 1984

[54] FILTER-CONDITIONER FOR MOTOR COOLING LIQUID

[75] Inventors: Gerald R. Franck, St. Paul; David B. Olsen, Lake Elmo, both of Minn.

[73] Assignee: Minnesota Mining and Manufacturing Company, St. Paul, Minn.

[21] Appl. No.: 303,520

[22] Filed: Sep. 18, 1981

Related U.S. Application Data

[63] Continuation of Ser. No. 26,406, Apr. 2, 1979, abandoned.

[51] Int. Cl.³ .................................... F28F 19/00
[52] U.S. Cl. .................... 165/119; 123/41.1; 210/136; 210/167
[58] Field of Search ............... 210/DIG. 26, 136, 167; 123/41.09, 41.51, 41.08; 165/119; 137/493.7, 493.8

[56] References Cited

U.S. PATENT DOCUMENTS

| | | | |
|---|---|---|---|
| 1,832,776 | 11/1931 | Hudson | 123/41.15 |
| 1,987,847 | 1/1935 | Flood | 210/167 |
| 2,127,271 | 8/1938 | Schenk | 123/41.21 |
| 2,488,806 | 11/1949 | Crowder | 210/167 |
| 2,672,853 | 3/1954 | Dunnigan | 123/41.08 |
| 2,879,975 | 3/1959 | Doi | 165/119 |
| 3,322,281 | 5/1967 | Gulick | 210/136 |
| 3,362,536 | 1/1968 | Sellman | 210/167 |
| 3,540,528 | 11/1970 | Moon | 165/119 |
| 3,645,402 | 2/1972 | Alexander et al. | 210/266 |
| 3,682,308 | 8/1972 | Moon | 210/167 |
| 3,726,262 | 4/1973 | Moon | 165/119 |
| 3,981,279 | 9/1976 | Bubniak et al. | 123/41.09 |
| 4,018,270 | 4/1977 | Kolinger | 165/119 |
| 4,051,031 | 9/1977 | Suziki | 210/136 |
| 4,260,012 | 4/1981 | Suarez | 210/435 |

FOREIGN PATENT DOCUMENTS 163228  6/1953  Australia .......................... 210/167

Primary Examiner—William R. Cline
Assistant Examiner—Theophil W. Streule, Jr.
Attorney, Agent, or Firm—Donald M. Sell; James A. Smith; William L. Huebsch

[57] ABSTRACT

An engine cooling system including a filter connected in a radiator overflow system so that fluid flowing from the radiator to an overflow reservoir under the influence of pressure in the radiator will flow around the filter, whereas fluid flowing from the overflow reservoir to the radiator under the influence of atmospheric pressure when the pressure in the radiator drops will pass slowly through the filter.

9 Claims, 5 Drawing Figures

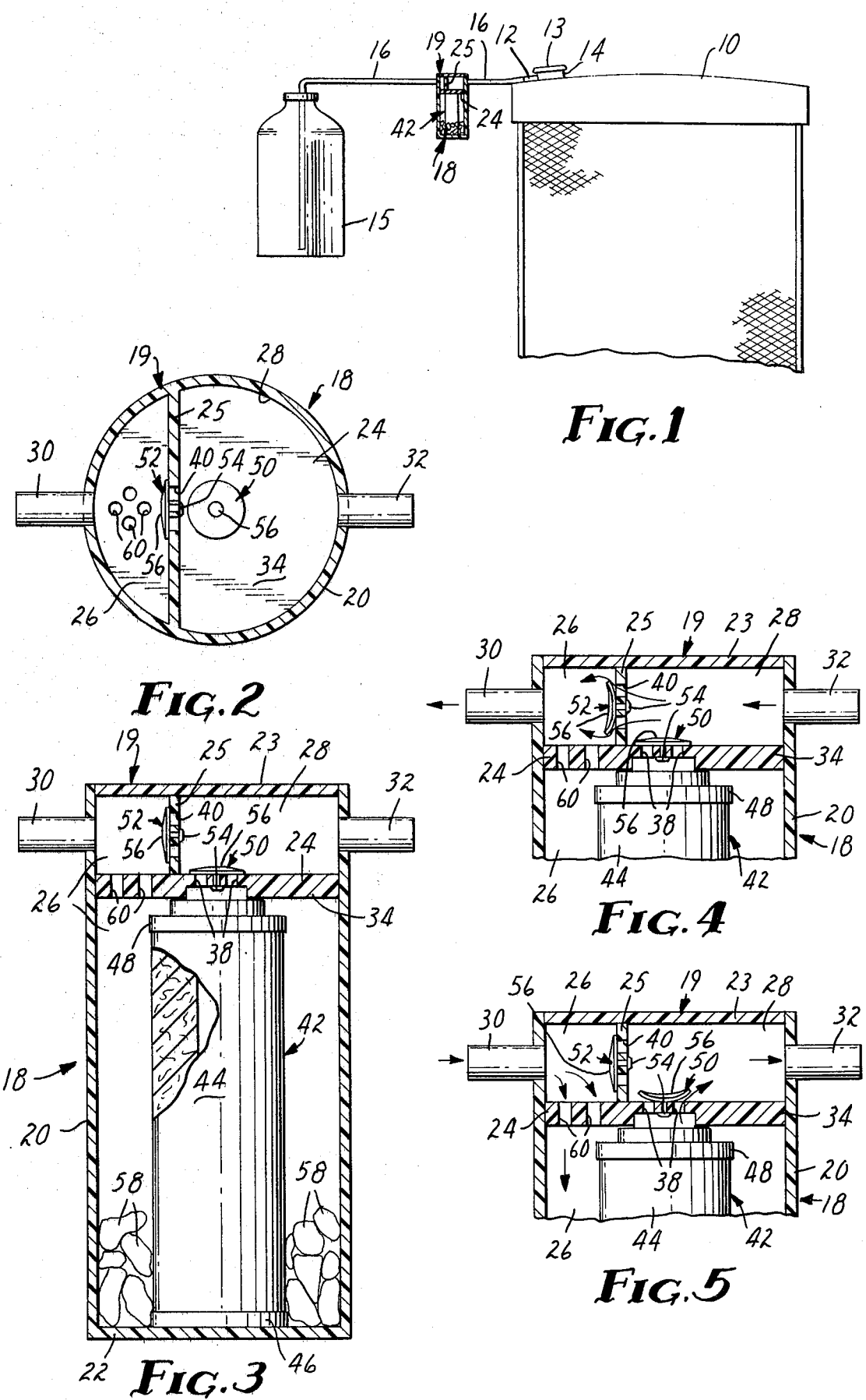

FILTER-CONDITIONER FOR MOTOR COOLING LIQUID

This is a continuation of application Ser. No. 026,406 filed Apr. 2, 1979, now abandoned.

BACKGROUND OF THE INVENTION

The cooling liquid used in the cooling systems for liquid cooled engines typically includes an ethylene glycol based antifreeze to effect efficient heat transfer and prevent freezing of the cooling liquid. While ethylene glycol based antifreeze is effective for these purposes, the ethylene glycol in the cooling liquid can be very corrosive to the cooling system. Also, a small percentage of the ethylene glycol will break down during repeated heating and cooling of the cooling liquid to form glycolic or formic acids which can attack the various metals exposed in the cooling system. Additionally, cooling systems often contain particles which were left in the system when the system was assembled, (e.g., rust or particles remaining from the casting process) or which were subsequently added to the system or produced in the system by chemical reactions described above, which particles circulate with the liquid as it is pumped through the cooling system. These particles can plug or coat portion of the passageways in the cooling system (such as in the heater core) and decrease the efficiency of the cooling system.

Filter-conditioner assemblies have been provided for some engines (see U.S. Pat. No. 3,645,402) to both filter the cooling liquid and add chemicals to the cooling liquid to restrict such chemical reactions. Heretofore, however, such known filter-conditioners have been designed for use in pressurized portions of cooling systems which necessitates a housing for the filter-conditioner that can withstand pressures of over 12 psi above atmospheric pressure, and thus have been very expensive for use to retrofit conventional automobiles which have typically not been provided such filter-conditioners at the factory. Thus to protect their cooling systems, automobile owners have typically resorted to either changing the ethylene glycol based antifreeze in the cooling systems of their automobiles more frequently than they might otherwise desire, and/or to adding chemicals to treat the cooling liquid directly to the cooling system.

SUMMARY OF THE INVENTION

The present invention provides a filter-conditioner which can either be added to an existing cooling system in an automobile or can be incorporated in a cooling system for an automobile during its manufacture, which filter-conditioner is adapted for use in a nonpressurized portion of the cooling system for the automobile so that it is inexpensive to manufacture but which is still effective for both filtering and conditioning the cooling liquid.

The filter-conditioner according to the present invention is adapted for use in engine cooling systems of the type comprising a radiator having an overflow tube, a pressure cap providing pressure valve means at the overflow tube for allowing liquid to flow out of the overflow tube to an overflow reservoir means or overflow tank at atmospheric pressure when the pressure in the radiator exceeds a predetermined level due to expansion of the liquid as the liquid is heated during initial operation of the engine, and for allowing liquid to flow back from the overflow tank into the radiator under the influence of atmospheric pressure when the pressure in the radiator drops to a predetermined level below atmospheric pressure due to contraction of the liquid in the radiator as it cools after use of the engine is discontinued. (Such radiator overflow systems have been factory installed in many automobiles, and can easily be added to most liquid cooling systems for motors installed either in automobiles or other vehicles or at fixed locations). The filter-conditioner according to the present invention provides in such a system means for filtering and chemically conditioning the portion of the cooling liquid which passes between the overflow tank and radiator during each heating and cooling cycle of the cooling system.

For most automobiles having this type of cooling system, abut one-half liter of liquid flows between the radiator and overflow tank during each heating and cooling cycle of the cooling system. Since the engine in an automobile is typically started and stopped numerous times each week, treating and filtering one-half liter of its cooling liquid as a result of each operational cycle has a significant cumulative effect on both the chemical composition and clarity of its cooling liquid over such a time period.

Since the filter-conditioner according to the present invention is not subjected to the pressures much above atmospheric pressure, the materials of which its housing is made need not be as strong as would otherwise be the case if the filter-conditioner were incorporated in the pressurized portion of the cooling system. Also, any couplings needed to incorporate it in the system need not be as secure and liquid tight, for even if such couplings were to fail and the liquid flowing to the overflow tank were lost, operation of the engine would not be prevented.

While the means for filtering and chemically conditioning could be incorporated in the overflow tank which receives and supplies liquid during the operational cycle of the engine, such overflow tanks in existing automobiles have such a variety of shapes and inlet opening sizes that a universal filter-conditioner for use therein would be difficult to design and such incorporation would best be done in the original design of the cooling system. Thus the preferred embodiment of the filter-conditioner for use in retrofitting existing cooling systems is adapted to be attached to the hose which commonly connects the overflow tube of the radiator with the overflow tank. This filter-conditioner comprises wall portions defining a filter chamber and a transfer chamber, which wall portions have a first opening into the filter chamber coupled via a hose to the overflow tank, and a second opening into the transfer chamber coupled via a hose to the overflow tube on the radiator. Also, the housing wall portions include a common wall portion separating the filter and transfer chambers, which common wall portion has spaced through first and second passageways. A filter positioned within the filter chamber has walls comprising porous material, defining a central opening and having an outlet opening communicating with the first through passageway. Valve means are positioned within the first and second passageways for allowing liquid flowing into the housing through the first opening to pass through the filter and first passageway, into the transfer chamber and out the second opening while blocking flow through the second passageway; and for allowing liquid flowing into the housing through the second opening to pass through the second passageway and out the first opening while blocking flow through the first passageway and into the filter. Thus the portion of the liquid moved back and forth through the filter-conditioner between the radiator and overflow tank during an operation cycle of the motor will be filtered and conditioned, but only as it moves in one direction through the filter-conditioner so that particles are collected on only one side of the filter and will not be flushed back into the cooling system as the liquid passes in the other direction through the filter-conditioner. While the filter-conditioner could be disposed to filter liquid flowing toward the overflow tank, preferably, as described above it is disposed to filter liquid as it flows from the overflow tank toward the radiatior. With this arrangement some particles will settle out of the liquid and remain in the overflow tank, thereby extending the useful life of the filter.

While filters adapted to remove particles of from 1 to 20 microns have worked in the filter-conditioner, according to the present invention, filters that remove particles of from 3 to 5 microns are preferred based on their effect under test conditions. Filters that collect particles either on their surface or within their fibers are both usable. One very satisfactory 3-micron filter that collects particles within its fibers is that commercially designated "AMF-Cuno U15A3 MicroKlean Filter Cartridge," available from the AMF-Cuno Division, Merriden, Connecticut.

The chemicals contained in the filter chamber to condition the liquid may include any of those commercially available for inhibiting corrosion of the cooling system by the ethylene glycol and for neutralizing acidity of the cooling liquid in the cooling system due to deteriorization of the ethylene glycol (e.g., that commercially designated "Nalco No. 39" available from Nalco Chemical Co., Oak Brook, Ill.), for providing a water pump lubricant and for restricting foaming of the cooling liquid (e.g., that commercially designated "UCON 50-HB-5100" available from Union Carbide, New York, N. Y.); or for softening the liquid in the system via ion exchange to prevent unwanted deposits or chemical reactions (e.g., Linde Molecular Sieves 5A, ⅛ inch pellets available from Linde Division, Union Carbide, New York, N. Y.).

Also, an oil absorbing material such as the blown microfiber commercially designated "Oil Sorbant" available from Minnesota Mining and Manufacturing Company of St. Paul, Minn. could be provided in the filter chamber to remove hydrocarbon impurities from the cooling liquid.

BRIEF DESCRIPTION OF THE DRAWING

The present invention will be further described with reference to the accompanying drawing wherein like numbers refer to like parts in the several views and wherein:

FIG. 1 is a vertical fragmentary view of a part of a cooling system for an engine having a filter-conditioner according to the present invention incorporated therein;

FIG. 2 is an enlarged sectional top view of the filter-conditioner as shown in FIG. 1;

FIG. 3 is an enlarged vertical sectional side view of the filter-conditioner shown in FIG. 1; and FIGS. 4 and 5 are fragmentary enlarged sectional side views of the filter-conditioner shown in FIG. 1 which illustrates the path of liquid flow in two different directions through the filter-conditioner.

DESCRIPTION OF THE PREFERRED EMBODIMENT

Referring now to the drawing, there is illustrated in FIG. 1 a portion of a liquid cooling system for an engine (not shown) comprising a radiator 10 having an overflow tube 12 through which fluid may flow out of or into the radiator 10 past a conventional pressure cap 13 releasably engaged with a neck 14 of the radiator 10. The pressure cap 13 provides pressure valve means for allowing liquid to flow out of the radiator 10 when liquid in the cooling system expands and causes a predetermined pressure in the radiator 10 due to heating of the liquid via initial operation of the engine, and for allowing liquid to flow back into the radiator 10 under the influence of atmospheric pressure when the pressure in the radiator 10 drops to a predetermined pressure below atmospheric pressure due to to contraction of the liquid in the radiator 10 as it cools after the engine is shut off. Also included in the system is an overflow reservoir means or overflow tank 15 for containing liquid expelled from the radiator 10 and for supplying liquid under atmospheric pressure at the overflow tube 12 of the radiator 10, which overflow tank 15 is coupled to the overflow tube 12 via two lengths of hose 16 (one of which extends to the bottom of the tank 15 to ensure that liquid will be sucked into the radiator 10 when the pressure therein drops to the predetermined pressure), and a filter-conditioner 18 according to the present invention between the lengths of hose 16 which provides means for filtering and chemically conditioning liquid passing into and out of the overflow tank 15 due to heating and cooling of the liquid in the radiator 10.

The filter-conditioner 18, best seen in FIGS. 2 through 5, includes a housing 19 comprising wall portions which may be made of an inexpensive polymeric material such as polyvinyl chloride or polypropylene. The wall portions include a cylindrical wall portion 20, circular end wall portions 22 and 23 at the ends of the cylindrical wall portion 20, a transverse wall portion 24 within and transverse of the cylindrical wall portion 20 at a position spaced from the end wall portions 22 and 23, and a dividing wall portion 25 oriented parallel to the axis of the cylindrical wall portion 20 and dividing the space between the end wall 23 and the transverse wall portion 24. These wall portions define both a filter chamber 26 and a transfer chamber 28. A tube 30 projects radially of the cylindrical wall portion 20 to provide a first opening into the filter chamber 26, and a tube 32 projects radially of the cylindrical wall portion 20 in a direction opposite the tube 30 to provide a second opening into the transfer chamber 28. A part 34 of the transverse wall portion 24 and the dividing wall portion 25 together provide a common wall portion separating the chambers 26 and 28 and have spaced through first and second passageways 38 and 40 respectively.

A filter 42 is positioned within the filter chamber 26. The filter 42 has a cylindrical porous wall 44 and circular end walls 46 and 48 which define a central opening in the filter 42, and is disposed with its end wall 48 sealably pressed against the adjacent surface of the transverse wall portion 24 of the housing 19 with an opening in the end wall 48 of the filter 42 communicating with the passageways 38.

Valve means comprising umbrella-shaped members 50 and 52 of flexible, resilient material (e.g., fluorosilicone rubber) are provided at the passageways 38 and 40 respectively for allowing liquid flowing into the housing 19 through the inlet tube 30 to pass through the filter 42 and first passageways 38 into the transfer chamber 28 while blocking flow through the second passageways 40 (FIG. 5); and for allowing fluid flowing into the housing through the second inlet tube 32 to pass through the second passageways 40 and out the tube 30 while blocking flow through the first passageways 38 and through the filter 42.

Each flexible umbrella-shaped member 50 or 52 is attached to the adjacent wall portion 24 or 25 via engagement of a centered stem 54 in an orifice central of the passageways 38 or 40 in that wall portion 24 or 25. A flexible disk-like portion 56 of the member 50 or 52 normally overlays the passageways 38 or 40, and will seal them shut in response to even a slight pressure against the side of the disk-like portion 56 opposite the passageways 38 or 40. Upon a pressure in the passageways 38 or 40 exceeding that on the opposite side of the adjacent disk-like portion 56, however, the edges of that disk-like portion 56 will separate from around the passageways 38 or 40 and allow liquid flow through the passageways 38 or 40.

The filter chamber 26 may contain one or more different chemicals 58 to provide conditioning for the liquid passing through the filter 44 as was previously explained.

As illustrated, the filter chamber 26 has portions separated by a part of the transverse wall portion 24 which has a plurality of through openings 60. The openings 60 allow free passage of liquid when liquid is flowing through the filter 42 as is shown in FIG. 5, while the part of the transverse wall portion 24 in which the openings 60 are located provides a baffle to restrict disturbing the liquid around the filter 42 when liquid is flowing into the tube 32 and out the tube 30 as is shown in FIG. 4.

OPERATION

To install the filter-conditioner 18 in the cooling system for an engine, a user simply severs the hose 16 between the radiator and the overflow tank, slides the severed end portions of the hose 16 over the tubes 30 and 32 with the portion of the hose 16 connected to the radiator 10 slid over the tube 32, and applies wire loops or conventional hose clamps (not shown) to retain the severed end portions of the hose 16 in place. Additionally a bracket (not shown) may be attached between the filter conditioner 18 and an adjacent sturdy structural member to support the filter-conditioner 18.

After the engine has been started, heat in the cooling system will cause the cooling liquid therein to expand and escape past the pressure cap 13 on the radiator 10 when a predetermined pressure is reached in the radiator 10 (e.g., 12 to 15 pounds per square inch). This escaping liquid will flow through the hose 16 and tube 32 into the transfer chamber 28 (where the flexible disk-like portion 56 of the member 50 will prevent the liquid from flowing through the openings 38 and filter 42) through the openings 40 past the flexible portion 56 of the member 52 which will flex away from the openings 40, into the filter chamber 26 out the tube 30 (FIG. 4), and through the hose 16 into the tank 15. This liquid displaced by expansion of liquid in the cooling system (typically about one half liter) will then remain in the tank 15 until the engine is shut off, whereupon the liquid in the radiator will begin to cool and contract. Such contraction will cause the pressure in the radiator 10 to drop below atmospheric pressure so that atmospheric pressure on the liquid in the overflow tank 15 will cause it to flow through the hose 16 and tube into the filter chamber 26 (where it will be prevented by the flexible disk-like portion 56 of the member 52 from flowing through the openings 40) through the openings 60 in the wall portion 24 into the portion of the filter chamber 26 where the chemicals 58 which treat the liquid are retained, through the porous wall 44 of the filter 42 where particles in the liquid will be trapped, through the opening in the end wall part 34 and through the openings 38 past the flexible portion 54 of the umbrella-shaped member 50 (which flexes away from the openings 38) into the transfer chamber 28. From the transfer chamber 28 the chemically treated and filtered liquid flows out the tube 32 and through the hose 16 back into the radiator 10.

We claim:

1. In an engine cooling system comprising a cooling liquid filled radiator having an overflow tube; pressure valve means in said radiator for allowing cooling liquid to flow out of said overflow tube from said radiator when the pressure in said radiator exceeds atmospheric pressure by a predetermined amount as a result of heat expansion of the liquid in the radiator, and for allowing cooling liquid to flow back into said radiator through said overflow tube under the influence of atmospheric pressure when the pressure in said radiator drops below atmospheric pressure as the cooling liquid in said radiator cools; and reservoir means coupled to said overflow tube for containing cooling liquid expelled through said outlet tube and for supplying cooling liquid under about atmospheric pressure at said outlet opening when the pressure in said radiator drops, the improvement wherein said system includes:

wall portions defining a filter chamber;
a filter within said filter chamber comprising a porous wall for filtering particles from liquid moving through said porous wall;
chemical means within said filter chamber for chemically conditioning cooling liquid passing through said filter chamber; and
means coupling said overflow tube, reservoir means and filter chamber together including valve means for causing fluid flowing between said radiator and said reservoir means under the influence of differential pressure to bypass said filter during movement of fluid through said overflow tube in one direction, and to pass through the porous wall of said filter during movement of fluid through said overflow tube in the other direction.

2. An engine cooling system according to claim 1 wherein:

said means coupling said overflow tube, reservoir means and filter chamber together comprises a housing having wall portions including said wall portions defining said filter chamber, said wall portions of said housing further define a transfer chamber, have a first opening into said filter chamber coupled to said reservoir means, have a second opening into said transfer chamber coupled to said overflow tube, and include common wall portions separating said chambers having spaced through first and second passageways;

said filter has filter walls comprising said porous wall defining a central opening within said filter and disposed in sealing engagement with one of said common wall portions around said first passageway with said central opening communicating with said first passageway so that the walls of said filter separate said first opening and said first passageway with said second passageway opening into said filter chamber on the same side of said filter walls as said first opening; and said valve means comprises a first one-way valve means at said first passageway and a second one-way valve at said second passageway, said first one-way valve means being adapted to open and said second one-way valve means being adapted to close when cooling liquid flows into said filter chamber through said first opening from said reservoir means so that said liquid passes through said filter chamber, said porous filter wall, said first passageway past said first one-way valve means, said transfer chamber and out said second opening to said overflow tube while flow of liquid through said second passageway around said porous filter wall is blocked by said second one-way valve means, and said first one-way valve means being adapted to close and said second one-way valve means being adapted to open when cooling liquid flows into said transfer chamber through said second opening from said overflow tube so that said liquid passes through said transfer chamber, said second passageway past said second one-way valve means into said filter chamber around said porous filter wall and out said first inlet to said reservoir means while said first one-way valve means blocks flow from said transfer chamber through said first passageway and through said porous filter wall.

3. An engine cooling system according to claim 1 wherein said filter is adapted to filter out particles in the size range of 1 to 20 microns.

4. An engine cooling system according to claim 1 wherein said filter is adapted to filter out particles in the size range of 3 to 5 microns.

5. A filter-conditioner adapted for use at about atmospheric pressure to treat the cooling liquid in an engine cooling system including a radiator having an overflow tube, an overflow tank at atmospheric pressure, means for connecting said overflow tube to said overflow tank, and pressure valve means in said radiator for allowing cooling liquid to flow out of said overflow tube from said radiator and into said overflow tank when the pressure in said radiator exceeds atmospheric pressure by a predetermined amount as a result of heat expansion of the liquid in the radiator, and for allowing cooling liquid to flow back into said radiator from said overflow tank through said overflow tube under the influence of atmospheric pressure when the pressure in said radiator drops below atmospheric pressure as the liquid in said radiator cools, said filter-conditioner including:

a housing adapted for use at about atmospheric pressure comprising wall portions defining a filter chamber and a transfer chamber, said wall portions having a first opening into said filter chamber and a second opening into said transfer chamber and including common wall portions separating said chambers having spaced through first and second passageways, said housing being adapted to be coupled to said means for connecting with one of said openings communicating with said overflow tank and the other of said openings communicating with said overflow tube;

a filter within said filter chamber, said filter having filter walls comprising a porous filter wall defining a central opening within said filter and being disposed in sealing engagement with one of said common wall portions around said first passageway with said central opening communicating with said first passageway so that the walls of said filter separate said first opening and said first passageway with said second passageway opening into said filter chamber on the same side of said porous filter wall as said first opening; and first one-way valve means at said first passageway and second one-way valve means at said second passageway, said first one-way valve means being adapted to open and said second one-way valve means being adapted to close when cooling liquid flows into said housing through said first opening so that said liquid passes through said filter chamber, said porous filter wall, said first passageway past said first one-way valve means, said transfer chamber and out said second opening while flow of liquid through said second passageway around said porous filter wall is blocked by said second one-way valve means, and said first one-way valve means being adapted to close and said second one-way valve means being adapted to open when cooling liquid flows into said housing through said second opening so that said liquid passes through said transfer chamber, said second passageway past said second one-way valve means into said filter chamber around said porous filter wall, and out said first opening while said first one-way valve means blocks flow through said first passageway and through said porous filter wall; and chemical means in said filter chamber for chemically conditioning the cooling liquid.

6. A filter-conditioner according to claim 5 wherein said chemical means in said filter chamber is adapted for inhibiting corrosion by said cooling liquid, for neutralizing acidity in said cooling liquid, for lubricating and for restricing foaming of the cooling liquid.

7. A filter-conditioner according to claim 5, wherein said filter is adapted to filter out particles in the size range of 1 to 20 microns.

8. A filter-conditioner according to claim 5 wherein said filter is adapted to filter out particle sin the size range of 3 to 5 microns.

9. A filter-conditioner according to claim 5 further including hydrocarbon absorbing blown microfibers in said filter chamber.

* * * * *